United States Patent
Thomson et al.

(10) Patent No.: US 8,301,160 B2
(45) Date of Patent: *Oct. 30, 2012

(54) SYSTEM AND METHOD FOR SUPL ROAMING USING A HELD CLIENT

(75) Inventors: Martin Thomson, Keiraville (AU); Anthony James Winterbottom, Gwynneville (AU); Nguyen Khiem Tran, Southerland (AU)

(73) Assignee: Andrew LLC, Hickory, NC (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/813,278

(22) Filed: Jun. 10, 2010

(65) Prior Publication Data

US 2010/0311439 A1 Dec. 9, 2010

Related U.S. Application Data

(63) Continuation-in-part of application No. 12/404,757, filed on Mar. 16, 2009.

(60) Provisional application No. 61/186,262, filed on Jun. 11, 2009.

(51) Int. Cl.
*H04W 4/00* (2009.01)
*H04W 24/00* (2009.01)
*G06F 15/16* (2006.01)
*G06F 15/177* (2006.01)

(52) U.S. Cl. ............... 455/456.1; 455/433; 370/338; 709/218; 709/220

(58) Field of Classification Search ............... 455/456.1; 370/338; 709/218, 220
See application file for complete search history.

(56) References Cited

U.S. PATENT DOCUMENTS

| | | | |
|---|---|---|---|
| 4,728,959 | A | 3/1988 | Maloney |
| 5,327,144 | A | 7/1994 | Stilp et al. |
| 5,608,410 | A | 3/1997 | Stilp et al. |
| 5,959,580 | A | 9/1999 | Maloney et al. |
| 6,047,192 | A | 4/2000 | Maloney |
| 6,091,362 | A | 7/2000 | Stilp |

(Continued)

FOREIGN PATENT DOCUMENTS

WO 2006031022 A1 3/2006

(Continued)

OTHER PUBLICATIONS

"Secure User Plane Location Architecture"; Open Mobile Alliance; Mar. 18, 2008; http://member.openmobilealliance.org/ftp/Public_documents/LOC/Permanent_documents/OMA-AD-SUPL-V2_0-20080318-D.zip; pp. 6, 7, 13, 25, 30 and 38. (Reference in Application No. 12/404,757).

(Continued)

*Primary Examiner* — Dwayne Bost
*Assistant Examiner* — Scott Trandai
(74) *Attorney, Agent, or Firm* — Duane Morris LLP (57) ABSTRACT

A system and method for assisting the H-SLP is selecting a V-SLP using the HELD client of a SET. The SET receives identity information from an access network regarding associated LIS. The SET relays this information as well as measurements taken of the wireless network to the H-SLP. If the H-SLP does not contain enough information to determine a location estimate, the H-SLP uses the identity information from the access network to find an associated SLP that may serve as a V-SLP. A request using roaming location protocol may then be transmitted from the H-SLP to the V-SLP for location assistance.

27 Claims, 7 Drawing Sheets

U.S. PATENT DOCUMENTS

| | | | |
|---|---|---|---|
| 6,097,336 A | 8/2000 | Stilp | |
| 6,101,178 A | 8/2000 | Beal | |
| 6,108,555 A | 8/2000 | Maloney et al. | |
| 6,115,599 A | 9/2000 | Stilp | |
| 6,119,013 A | 9/2000 | Maloney et al. | |
| 6,127,975 A | 10/2000 | Maloney | |
| 6,172,644 B1 | 1/2001 | Stilp | |
| 6,184,829 B1 | 2/2001 | Stilp | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,288,675 B1 | 9/2001 | Maloney | |
| 6,288,676 B1 | 9/2001 | Maloney | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack | |
| 6,388,618 B1 | 5/2002 | Stilp et al. | |
| 6,400,320 B1 | 6/2002 | Stilp et al. | |
| 6,463,290 B1 | 10/2002 | Stilp et al. | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,546,256 B1 | 4/2003 | Maloney | |
| 6,563,460 B2 | 5/2003 | Stilp et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,771,625 B1 | 8/2004 | Beal | |
| 6,782,264 B2 | 8/2004 | Anderson | |
| 6,873,290 B2 | 3/2005 | Anderson et al. | |
| 6,876,859 B2 | 4/2005 | Anderson et al. | |
| 6,996,392 B2 | 2/2006 | Anderson | |
| 7,023,383 B2 | 4/2006 | Stilp et al. | |
| 7,167,713 B2 | 1/2007 | Anderson | |
| 7,271,765 B2 | 9/2007 | Stilp et al. | |
| 7,340,259 B2 | 3/2008 | Maloney | |
| 7,427,952 B2 | 9/2008 | Bull et al. | |
| 7,440,762 B2 | 10/2008 | Maloney et al. | |
| 7,593,738 B2 | 9/2009 | Anderson | |
| 7,613,155 B2 * | 11/2009 | Shim | 370/338 |
| 7,778,639 B2 * | 8/2010 | Shim | 455/433 |
| 7,962,153 B2 * | 6/2011 | Yan | 455/456.1 |
| 8,000,701 B2 * | 8/2011 | Dawson | 455/433 |
| 2002/0172223 A1 | 11/2002 | Stilp et al. | |
| 2003/0064734 A1 | 4/2003 | Stilp et al. | |
| 2003/0143988 A1 * | 7/2003 | Jamadagni | 455/418 |
| 2006/0003775 A1 | 1/2006 | Bull et al. | |
| 2006/0030333 A1 | 2/2006 | Ward et al. | |
| 2006/0058042 A1 * | 3/2006 | Shim | 455/456.3 |
| 2006/0246919 A1 * | 11/2006 | Park et al. | 455/456.1 |
| 2007/0111746 A1 | 5/2007 | Anderson et al. | |
| 2007/0155401 A1 | 7/2007 | Ward et al. | |
| 2007/0155489 A1 | 7/2007 | Beckley et al. | |
| 2007/0182547 A1 | 8/2007 | Wachter et al. | |
| 2007/0286212 A1 * | 12/2007 | Kim et al. | 370/398 |
| 2007/0287411 A1 * | 12/2007 | Kim et al. | 455/404.2 |
| 2007/0287448 A1 * | 12/2007 | Kim et al. | 455/433 |
| 2007/0293239 A1 * | 12/2007 | Dawson et al. | 455/456.1 |
| 2008/0005275 A1 * | 1/2008 | Overton et al. | 709/218 |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0200182 A1 * | 8/2008 | Shim | 455/456.1 |
| 2008/0228654 A1 * | 9/2008 | Edge | 705/71 |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2009/0191841 A1 * | 7/2009 | Edge et al. | 455/404.1 |
| 2010/0062752 A1 * | 3/2010 | Shim | 455/418 |
| 2011/0004672 A1 * | 1/2011 | Garcia-Martin et al. | 709/220 |
| 2012/0028598 A1 * | 2/2012 | Bakker et al. | 455/404.1 |
| 2012/0184293 A1 * | 7/2012 | Li et al. | 455/456.1 |
| 2012/0202447 A1 * | 8/2012 | Edge et al. | 455/404.2 |
| 2012/0202517 A1 * | 8/2012 | Edge et al. | 455/456.1 |

FOREIGN PATENT DOCUMENTS

| | | |
|---|---|---|
| WO | 2006088472 A1 | 8/2006 |
| WO | 2009022857 A2 | 2/2009 |

OTHER PUBLICATIONS

M. Vanderveen; "AAA Separation for Roaming"; Jan. 8, 2007; Internet Engineering; pp. 5-7 (Reference in Application No. 12/404,757).

"3rd Generation Partnership Project; Technical Specification Group Services and System Aspects; Functional Stage 2 Description of Location Services (LCS)"; Dec. 1, 2008; V8; France; pp. 1-145 (Reference in Application No. 12/404,757).

* cited by examiner

SYSTEM AND METHOD FOR SUPL ROAMING USING A HELD CLIENT

RELATED APPLICATIONS

This application is a CIP of co-pending U.S. application Ser. No. 12/404,757 entitled "SYSTEM AND METHOD FOR SUPL ROAMING IN WIMAX NETWORKS", filed Mar. 16, 2009. This application is co-pending with and claims priority benefit of U.S. provisional application No. 61/186, 262 entitled "SUPL HELD INTERWORKING" filed Jun. 11, 2009. This application is also related to concurrently filed and co-pending U.S. non-provisional application Ser. No. 12/782, 920 entitled "SYSTEM AND METHOD FOR SUPL HELD INTERWORKING". The entirety of the disclosures are herein incorporated by reference.

BACKGROUND

This disclosure generally relates to location and roaming approaches in GSM, CDMA, and UMTS networks. Further, this disclosure relates to user plane location approaches in core networks and complementary access networks.

Mobile communications infrastructure is typically conceptualized in two generally separate components: the core network ("CN") and the radio access network ("RAN"). Together, this infrastructure enables user equipment ("UE"), the RAN, and CN to be developed and implemented separately according to the permissive standards set by organizations such as 3GPP and ITEU. Thus, various types of RANs, such as GERAN or UTRAN, may be paired with a single UMTS CN. Also, the UMTS standards provide for protocol separation between data related to user communications and data related to control of the network's various components. For example, within a UMTS mobile communications network, User Plane ("UP") bearers are responsible for the transfer of user data, including but not limited to voice or application data. Control Plane ("CoP") bearers handle control signaling and overall resource management.

As mobile networks transition towards 3G and beyond, location services (LCS, applications of which are sometimes referred to as Location Based Services, or LBS) have emerged as a vital service component enabled or provided by wireless communications networks. In addition to providing services conforming to government regulations such as wireless E911, LCS solutions also provide enhanced usability for mobile subscribers and revenue opportunities for network operators and service providers alike.

Position includes geographic coordinates, relative position, and derivatives such as velocity and acceleration. Although the term "position" is sometimes used to denote geographical position of an end-user while "location" is used to refer to the location within the network structure, these terms may often be used interchangeably without causing confusion, Common position measurement types used in mobile positioning or LCS include, but are not limited to, range, proximity, signal strength (such as path loss models or signal strength maps), round trip time, time of arrival, and angle of arrival. Multiple measurements may be combined, sometimes depending on which measurement types are available, to measure position. These combination approaches include, but are not limited to, radial (for example, employing multiple range measurements to solve for best agreement among circular loci), angle (for example, combining range and bearing using signal strength or round trip time), hyperbolic (for example, using multiple time-of-arrival), and real time differencing (for example, determining actual clock offsets between base stations).

Generally, LCS methods are accomplished through CoP or UP methods. CoP Location ("CoPL") refers to using control signaling within the network to provide location information of the subscriber or UE. UP Location ("UPL"), such as Secure User Plane Location ("SUPL") uses user data to provide location information. CoPL location approaches include, but are not limited to, Angle-of-Arrival ("AoA"), Observed Time-Difference-of-Arrival ("OTDOA"), Observed-Time-Difference ("OTD"), Enhanced-OTD ("E-OTD"), Assisted Global Positioning System ("A-GPS"), and Assisted Galileo Navigation Satellite System ("A-GNSS"). UPL approaches include, but are not limited to, A-GPS, and A-GNSS, where this position data is communicated over Internet Protocol ("IP").

Figure 1:
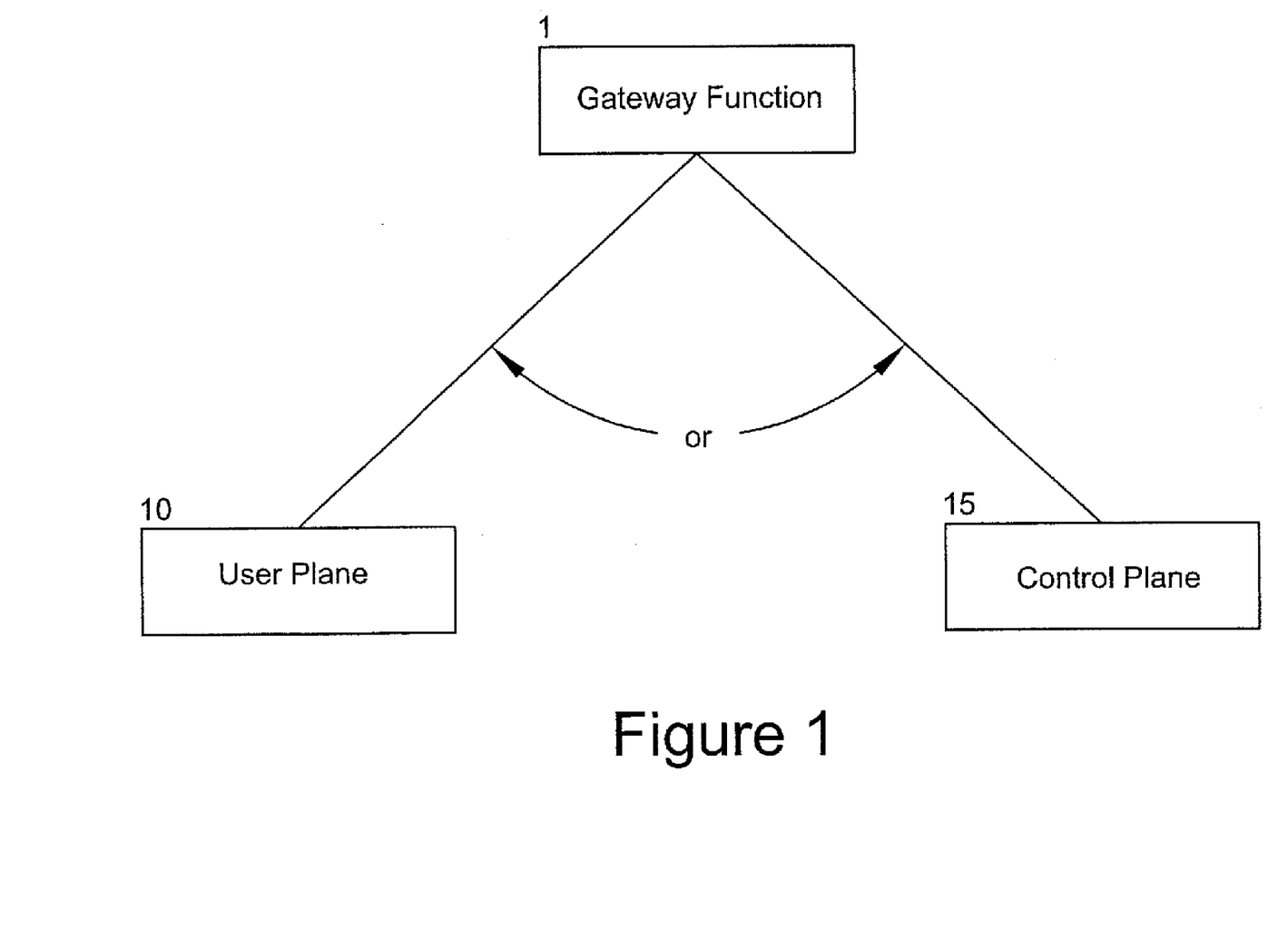
FIG. 1 is an illustration of a prior art gateway function.

There are two established architectures associated with location determination in modern cellular networks. The architectures are Control Plane ("CoP") and User Plane ("UP") architectures. Typically location requests are sent to a network through a query gateway function 1. Depending on the network implementation CoP 15 or UP 10 may be used but not a combination of both, as shown in FIG. 1. Note that queries may also come directly from the target device itself rather than via a gateway. Similarly, CoP or UP may be used but not both.

The difference between user plane and control plane, strictly, is that the former uses the communication bearer established with the device in order to communicate measurements. The latter uses the native signaling channels supported by the controlling network elements of the core and access to communicate measurements. As such, CoPL supports A-GPS—it uses control plane signaling interfaces to communicate GPS data to/from the handset. Similarly UPL may conduct E-OTD—the handset takes the timing measurements but it communicates them to the location platform using the data bearer.

UPL has the advantage of not depending on specific access technology to communicate measurement information. CoPL has the advantage that it may access and communicate measurements which may not be available to the device. Current models require network operators to deploy one or the other, CoPL or UPL.

CoPL uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for the performing location procedures. CoPL may utilize measurements made by both the control plane network elements as well as the end-user device being located.

Developed as an alternative to CoPL, Secure User Plane Location ("SUPL") is set of standards managed by the Open Mobile Alliance ("OMA") to transfer assistance data and positioning data over IP to aid network and terminal-based positioning technologies in ascertaining the position of a SUPL Enabled Terminal ("SET").

User Plane Location ("UPL") does not explicitly utilize the control plane infrastructure. Instead UPL assumes that a data bearer plane is available between the location platform and the end-user device. That is, a control plane infrastructure may have been involved in establishing the data bearer so that communication may occur with the device but no location-specific procedural signaling occurs over the control plane.

As such, UPL is limited to obtaining measurements directly from the end-user device itself.

SUPL includes a Location User Plan ("Lup") reference point, the interface between the SUPL Location Platform ("SLP") and SET, as well as security, authentication, authorization, charging functions, roaming, and privacy functions. For determining position, SUPL generally implements A-GPS, A-GNSS, or similar technology to communicate location data to a designated network node over Internet Protocol ("IP").

Figure 2A:
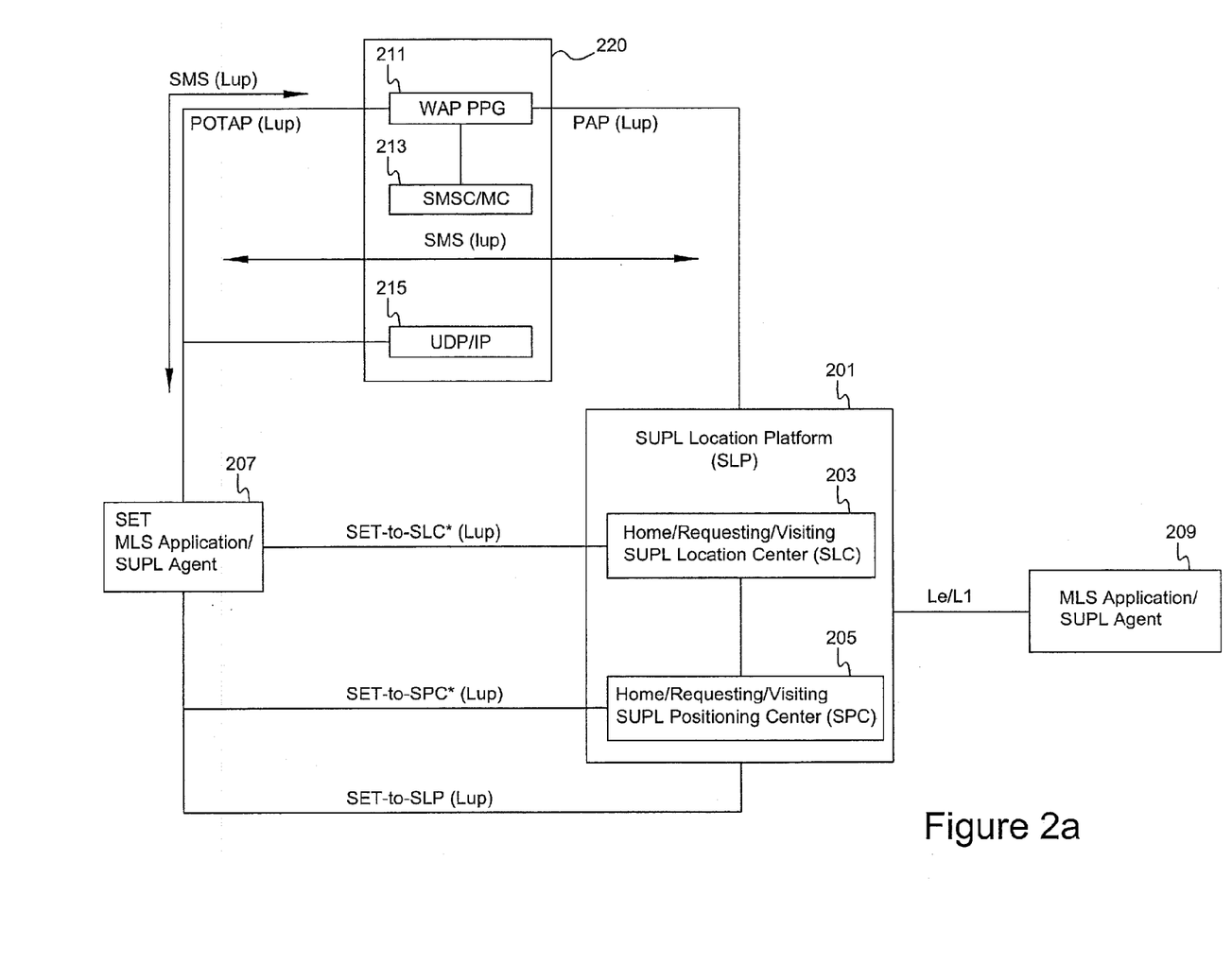
FIG. 2A is an illustration of an exemplary architectural diagram for SUPL.

FIG. 2A illustrates an exemplary architectural diagram for SUPL. The illustrated entities represent a group of functions, and not necessarily separate physical devices. In the SUPL architecture, an SLP 201 and SET 207 are provided. The SLP 201 generally includes a SUPL Location Center ("SLC") 203 and a SUPL Positioning Center ("SPC") 205. The SLC and SPC optionally communicate over the LIp interface, for instance, when the SLC and SPC are deployed as separate entities. The SET 207 generally includes a mobile location services ("MLS") application 209, an application which requests and consumes location information, or a SUPL Agent, a service access point which accesses the network resources to obtain location information.

For any SET, an SLP 201 may perform the role of the home SLP ("H-SLP"), visited SLP ("V-SLP") or emergency SLP ("E-SLP"). An H-SLP for a SET includes the subscription, authentication, and privacy related data for the SET and is generally associated with a part of the SET's home PLMN. A V-SLP for a SET is an SLP selected by an H-SLP or E-SLP to assist in positioning thereof. An E-SLP for a SET is an SLP associated with or contained in the PLMN serving the SET. The E-SLP may perform positioning in association with emergency services initiated by the SET.

The SLC 203 coordinates operations of SUPL in the network and interacts with the SET over the User Plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

SUPL session initiation is network-initiated or SET-initiated. The SUPL architecture provides various alternatives for initiating and facilitating SUPL functions. For example, a SUPL Initiation Function ("SIF") is optionally initiated using a Wireless Application Protocol Push Proxy Gateway ("WAP PPG") 211, a Short Message Service Center ("SMSC/MC") 213, or a User Datagram Protocol/Internet Protocol ("UDP/IP") 215 core, which forms user plane bearer 220.

Figure 2B:
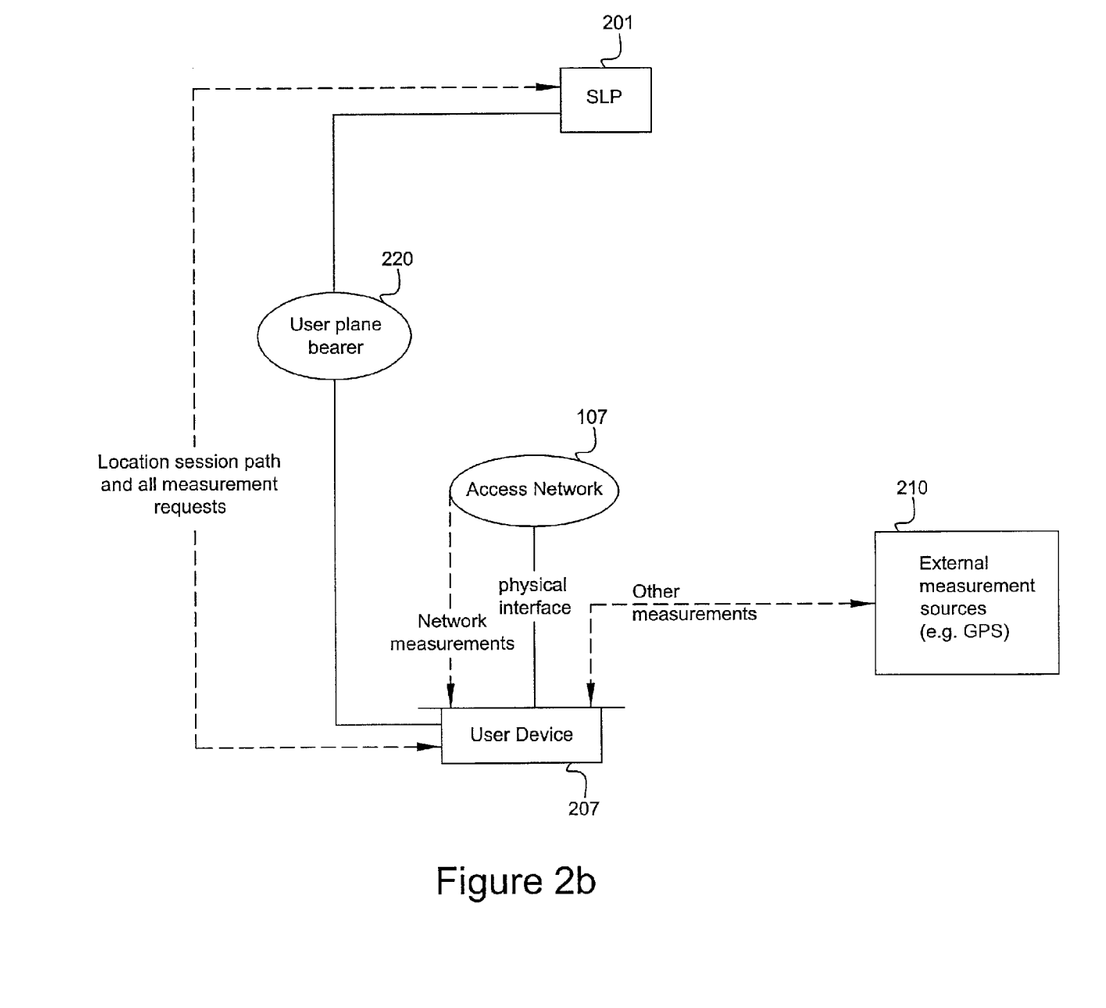
FIG. 2B is an illustration of the operation of an exemplary SUPL architecture.

The operation of UPL is shown in FIG. 2B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer 220) is established between the device 207 and the SLP 201. From then on, the SLP 201 may request measurement information from the device 207. The device may also take measurements from the network 107 or from external systems such as GPS 210. Because there is no control plane connectivity to the network, the SLP 201 cannot directly request any measurement information from the network 107 itself. More information on SUPL, including the Secure User Plane Location Architecture documentation ("OMA-AD-SUPL"), may be readily obtained through OMA.

The SUPL Location Platform is a location server defined as part of the SUPL specification standardized by the OMA. It uses the User plane Location Protocol to determine the position of a SET. Each SET has a Home SLP (H-SLP) with which it has a special trust relationship The Http Enabled Location Delivery (HELD) protocol is a Layer 7 location configuration protocol used for retrieving location information from a Location information server (LIS) within an access network. The protocol includes options for retrieving location information in two forms; by value and by reference. The device may acquire a literal location object describing the location of the device. If the mobile device requests a location by value it may request that the LIS create a PIDF-LO document. The device may request that the LIS provide a location reference in the faun of a location Uniform Resource Identifier (URI_or set of location URIs allowing the device to distributes its location information by reference. Both of these methods may be provided concurrently from the same LIS. The protocol is an extensible application-layer protocol. The HELD protocol is defined independently of any lower layers used to transport messages from one host to another. Generally HELD relies upon the underlying transport layer to provide authentication, confidentiality and protection.

Figure 3:
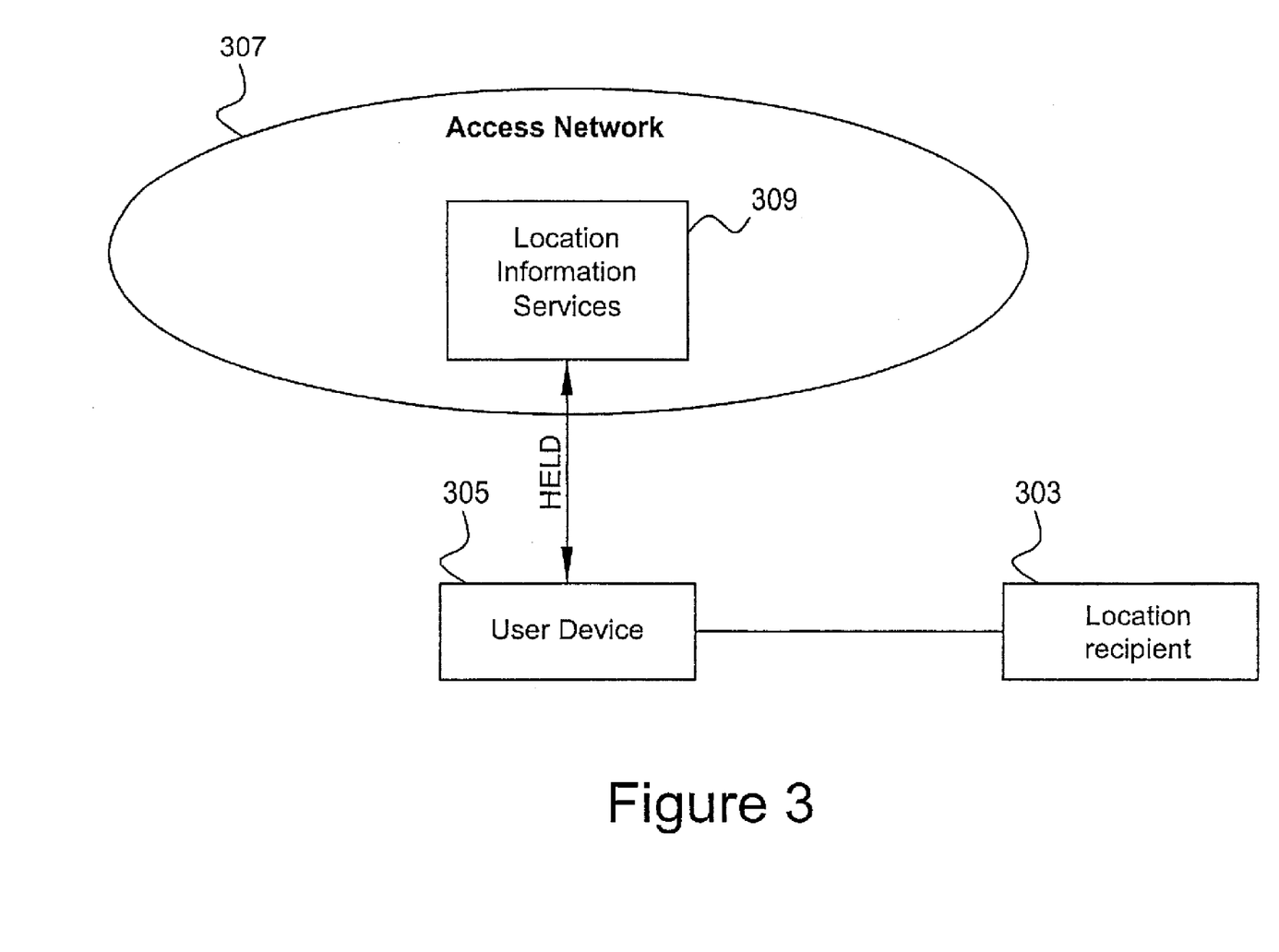
FIG. 3 is an illustration of the operation an exemplary HELD architecture.

FIG. 3 is an illustration of a mobile device interaction with the local access network utilizing its HELD Client. The LIS, is a network server that provides devices with information about their location. Devices that require location information are able to request their location from the LIS. In the architectures developed by the Internet Engineering Task Force (IETF), National Emergency Number Association (NENA) and other standards forums, the LIS is made available in the IP access network that connects the device to the Internet. In other modes of operation, the LIS also provides location information to other requesters relating to a target device. The HELD protocol relies upon the location information server to provide location information to the recipient 303.

A LIS 309 is responsible for providing that location information to devices within an access network 307. The LIS uses knowledge of the access network and its physical topology to generate and serve location information to devices. Each access network retains specific knowledge about topology and information regarding the appropriate LIS that has the specific knowledge necessary to locate a device. Automatic discover of the LIS is important where there is any chance of movement outside a single access network. Reliance on static configuration may lead to unexpected errors if a device moves between access networks.

Dynamic Host Configuration Protocol (DHCP) is a computer networking protocol used by hosts to retrieve IP address assignments and other configuration information. DHCP allows the access network provider to specify the address of a LIS as part of network configuration. If the device is able to acquire a LIS URI using DHCP or other protocol than this URI may be used directly. (A Uniform Resource Identifier (URI) is a compact sequence of characters that identifies an abstract or physical resource. A location URI identifies a geographic location using a textual representation of the location's spatial coordinates in either two or three dimensions.)

An access provider (AP) operates the LIS so that devices (and targets) may retrieve their location information. The LIS exists since not all Devices are capable of determining location information, and in many cases it is more efficient to determine the location information with assistance from the LIS.

Typically, the device discovers the URI for the LIS for sending the HELD protocol requests from it initialization over the access network. The product of the LIS discovery process is one or more Http URI. These URIs may be used for location configuration using HELD. Additional information regarding automatic discovery may be found in Thomson, Winterbottom, "Discovering the local Location Information Server (LIS)" IETF, Feb. 9, 2009, the entirety of which is incorporated by reference.

The access network 307 is the network that provides a connection between a device and the Internet. The access network 307 may include the physical infrastructure: cabling, radio transmitters, switching and routing nodes and servers. The access network covers the infrastructure necessary to provide a physical connection to the Internet. The access network also covers the services required to enable IP communication, which include servers that provide addressing and configuration information such as DHCP and Domain Name Server (DNS) servers. DHCP is a computer networking protocol used by hosts to retrieve IP address assignments and other configuration information.

In certain situations such as roaming, the SLP may not have enough information about network topology to determine an accurate location estimate and may need assistance from another SLP. Additionally, the LIS may not be able to provide a literal location or a literal location with the accuracy required by the request. The present subject matter is directed to leveraging the information inherently provided by the LIS to the HELD client to assist the H-SLP in determining an appropriate V- SLP for determining a location estimate.

The prior art does not explicitly define how H-SLP servers determines the V-SLP. Thus, there is a need in the art to overcome, the limitations of the prior art and provide a novel system and method for SUPL roaming in networks.

The current subject matter leverages the discovery process of the HELD client to assist the H-SLP in selecting an appropriate V-SLP in order to locate the device.

In order to obviate the deficiencies of the prior art, the present subject matter discloses a novel method for assisting in the selection of a visiting secure user plane location platform (SLP) for a mobile device. The method includes accessing a network and searching a location information server associated with the access network using a HTTP protocol. The method includes receiving identifying information from the LIS; and, transmitting the identifying information along with the characteristics of the wireless communications network to the H-SLP. The H-SLP using the LIS to aid in the selection of a V-SLP to locate the mobile device.

It is further an object to present a novel method of selecting a second secure user plane location platform (SLP) for a mobile device, the mobile device having an integrated secure user plane location (SUPL) and HTTP enabled location delivery (HELD) client. The method including initiating a SUPL session; accessing a network and requesting identity information is received at the mobile device and is transmitted along with network measurements to a first secure user plane location platform. The first secure user plane location platform selecting the second SLP based upon the identity of the LIS and whether the LIS is associated with a SLP.

It is still an object of the disclosed subject matter to present a method of locating a SUPL enabled terminal (SET) mobile device having a HTTP enable Location delivery (HELD) client. The method includes initiating a location session; requesting network measurements of a wireless communications network form the mobile device. Information regarding LISs associated with a network assessed by the mobile devices as a HELD client along with the requested network measurements is received and V-SLP is selected based upon the identifying information It is still another object to present a system for selecting a V-SLP for a roaming mobile device. The system includes the mobile device which includes a SUPL enable Terminal (SET) having an integral HELD client; a local Access network assessable by the HELD client of the SET; the local access networking having a LIS associated with a SLP. The system further includes a H-SLP associated with the mobile device. The local access network provides identity information of the LIS to the mobile via the HELD client which in turn provides the identity information to the H-SLP, the H-SLP determines a V-SLP based on the identity information.

Another embodiment of the present subject matter provides a method for providing assistance data to a mobile device in a wireless communications network. These embodiments and many other objects and advantages thereof will be readily apparent to one skilled in the art to which the disclosed subject matter pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for SUPL roaming are herein described.

As noted earlier, each SET has a H-SLP with which it has a special trust relationship. For SET initiated location requests, the SET typically contacts its own H-SLP first, and if the H-SLP cannot provide a location for the SET's current access network, it is the responsibility of the H-SLP to identify another SLP which may perform the request and then to initiate SUPL roaming procedures to allow the new SLP to assist with the position determination.

For network initiated location requests, the H-SLP contacts the SET and indicates that a SUPL session required. Once again, if the SET turns out to be in an access network that the H-SLP does not support, it is the H-SLP's responsibility to identify a V-SLP and to initiate SUPL roaming procedures.

In SUPL, there is also the concept of emergency location requests. In this case, the SET is allowed to respond to unknown Emergency SLPs (E-SLPs) for emergency network initiated requests. In this case, it is the responsibility of the E-SLP to identify an V-SLP to assist with positioning if the E-SLP is not able to locate the SET in its current access network. In either case, if the H-SLP or E-SLP cannot provide an adequate location estimate, a V-SLP may be required.

The LIS is a network server that provides devices with information about their location. It uses the HELD protocol standardized by the IETF. Devices that require location information request their location from the LIS. In the architectures developed by the IETF, NENA and other standards forums, the LIS is made available in the IP access network that connects the device to the Internet. In other modes of operation, the LIS also provides location information to other requesters relating to a target device.

Unlike the SLP in SUPL, the trust relationship between the device and the LIS is based on the characteristics of the access network. There are standardized methods for HELD clients to discover LISs in arbitrary access networks and it is generally assumed that when the access network is trusted, then so is the LIS associated with the access network. In addition the trust relationship of the access network may be based on other relationships such an entity which administers a plurality of access networks. If the entity is trusted, those access networks associated therewith may be trusted.

The disclosed subject matter describes a system and method whereby the HELD protocol may be used to assist an H-SLP in identifying an V-SLP.

The method uses the integrated SUPL SET and HELD client to identify a locally discovered LIS to the H-SLP and uses a URI provided by that LIS to notify the H-SLP of an SLP potentially usable as an V-SLP.

In a SUPL session (whether network initiated or SET initiated), the SET is responsible for gathering network information and reporting this back to the H-SLP (or E-SLP for emergency requests). With this disclosed subject matter, prior to sending this information, the SET first attempts to discover any local LISs in one or more of its available access networks using its integrated HELD client or DHCP client. The access networks may be any of WiFi, WiMax, Bluetooth, 802.11, TDMA, CDMA, AMPS, GPRS, UMTS, LTE. WiFi, WiMax, Bluetooth, 802.11, or wire. These networks do not need to be the same access network used for connecting to the SLP, for example the mobile device may be connected to the SLP over a CDMA wireless communication system and connected to the access network over a WiFi connection. The device uses the HELD protocol to obtain IETF defined Presence Information Data Format Location Objects (PIDF-LOs) from the LISs, which may include position estimates and civic addresses. It may also obtain location URIs which enable other parties to query the LIS for a location by reference as discussed in the background.

If any LIS are discovered, their identities are sent to the relevant SLP (H-SLP or E-SLP) along with the other requested network measurements. These identities may be transmitted in the form of URIs. In addition to their own identities, the access network may also provide the SET with URIs for a plurality of LIS and or SLPs associated with the access networks.

In a receiving the URI, the H-SLP may determine whether any of them are also SLPs which could act as V-SLPs, based on the URI. The H-SLP may then initiate SUPL roaming procedures with a chosen V-SLP if desired.

Figure 4:
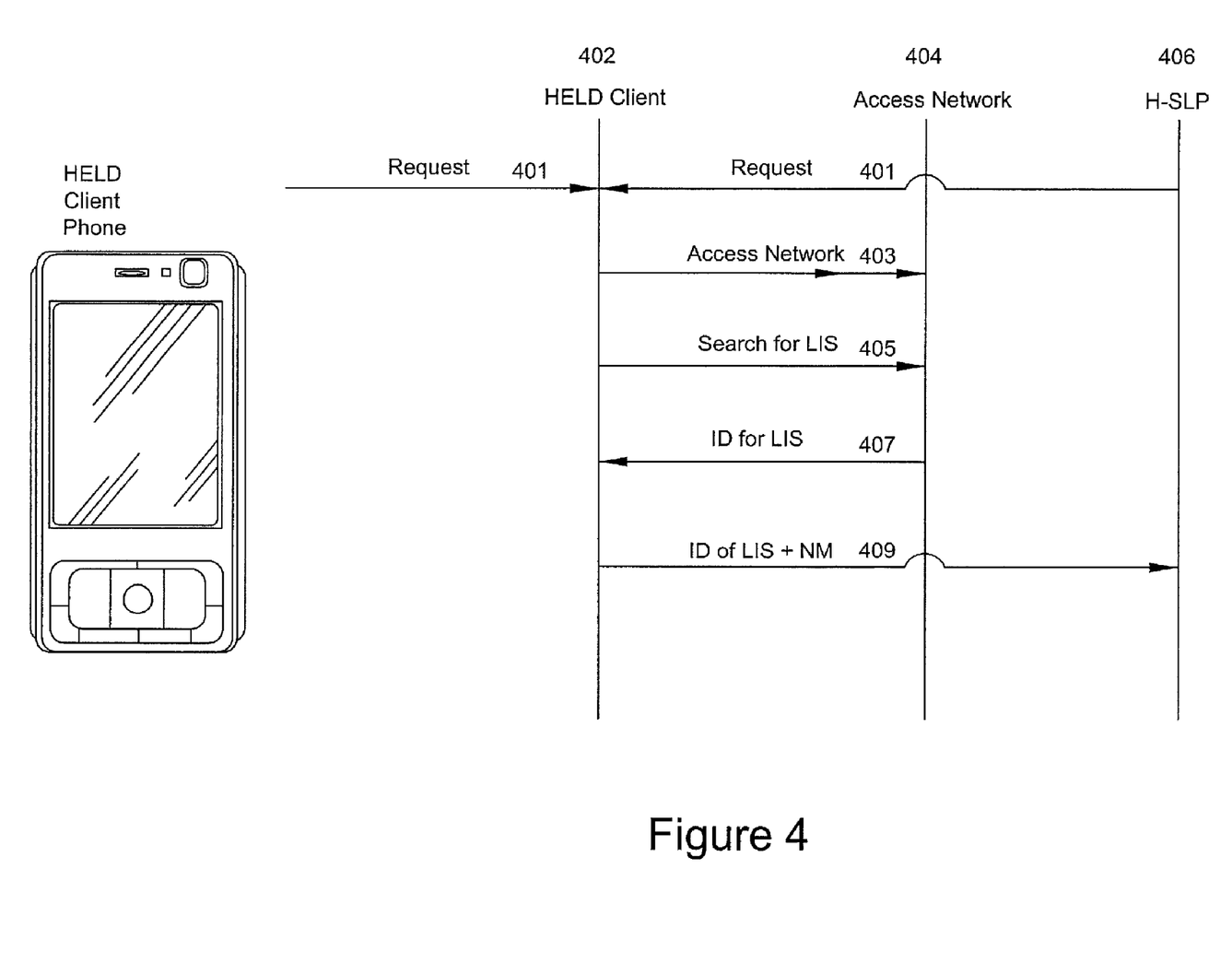
FIG. 4 is an algorithm according to one embodiment of the present subject matter.

FIG. 4 illustrates the operation of a mobile device that is a SUPL enabled terminal (SET) as well as a HELD client according to an embodiment of the present subject matter. The mobile device 402 has a HELD client which receives a request 401 for a SUPL session from the mobile itself or the H-SLP 406 associated with the mobile. The mobile accesses the access network 404 as shown in 403 and searches for an LIS on the access network 404 as shown in 405. The access network returns identity information on one or more LIS in the access network as shown in 407. The mobile device 402 sends along with any network measurements requested by the H-SLP 406, the identity information regarding the LIS on the access network as shown in 409. The H-SLP 406 may then use this information regarding the LIS to determine if and which SLP may be used as a V-SLP for the roaming mobile device. The H-SLP 406 may further inform the device of its selection of the V-SLP.

Figure 5:
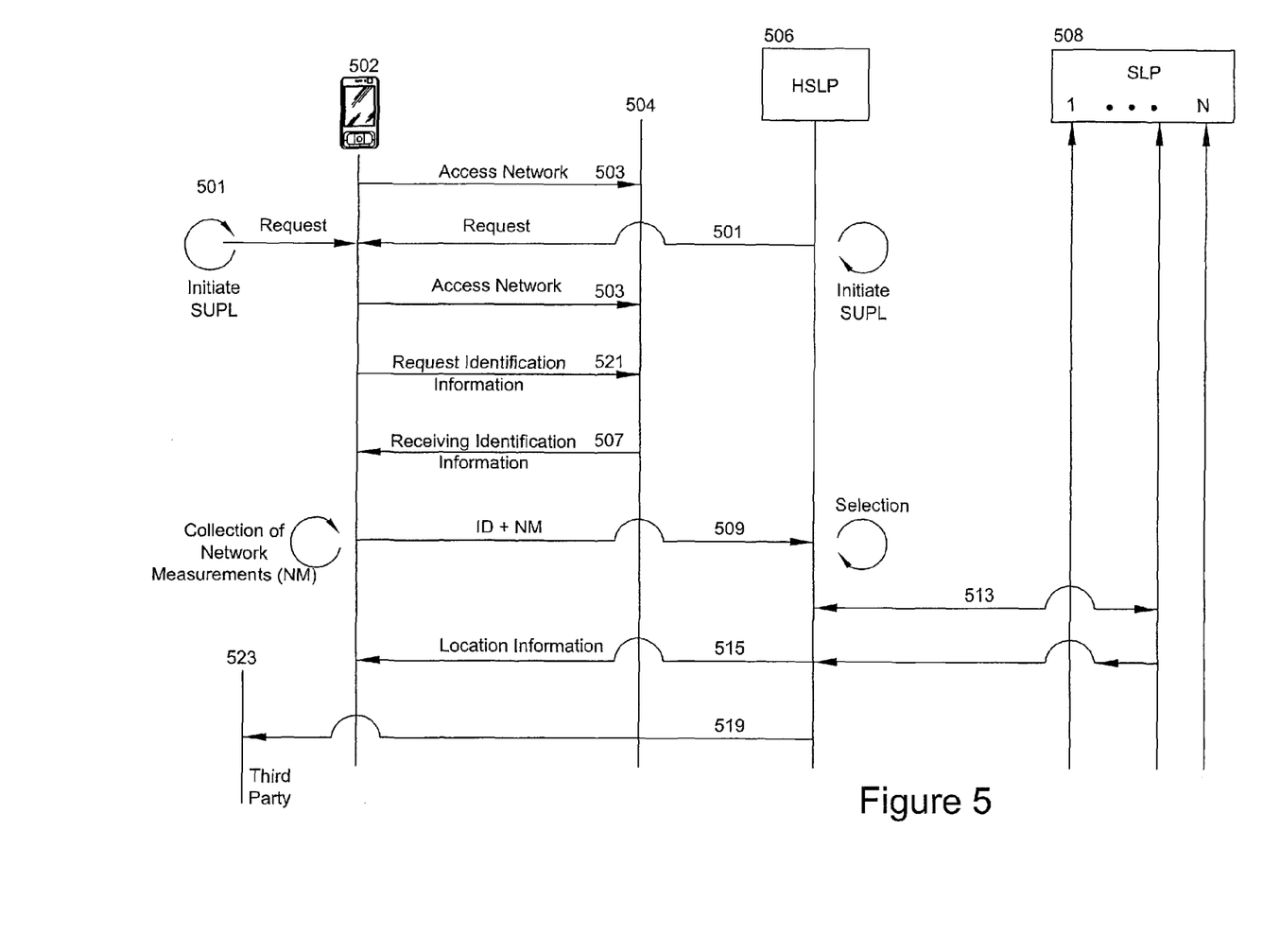
FIG. 5 is a flow chart illustrating the operation of a SLP according to an embodiment of the present subject matter.

FIG. 5 illustrates the operation of a mobile with SET and HELD capabilities, the H-SLP, the access network and the SLPs in performing a selection of the V-SLP. A request for a SUPL session is received from a mobile itself, or the H-SLP or a third party 523 via the H-SLP. The mobile device 502 accesses a local network as shown in 503. The sequence of the request 501 and the access of the network 503 may be interchanged. In some instances, the mobile device may have recently accessed the network or currently connected to the access network when the request 501 is received and may have already completed discovery of LIS's on the network. The mobile device 502 requests identification of LIS's serving the access network as shown in 521, this request may be part of the initialization upon connecting to the network or may be a discovery process. The identity information is received by the mobile device 502 as shown in 507 and the mobile device transmits the identity information to the H-SLP 506 as shown in 509. In addition to the identity information, the mobile may also send network characteristics measured by the mobile, these measurements are typically requested by the H-SLP 506 in initiating the SUPL session. The H-SLP having the identity of the LIS makes a selection of a V-SLP from the SLP's 508 based on the identity information. The H-SLP may then request the V-SLP to locate the mobile device 502 as shown in 513. The H-SLP preferably includes in the location request the identity of the mobile. Upon locating the mobile device 502, the V-SLP sends location information to the mobile device 502 via the H-SLP or to a third party requestor 523 as shown in 515 and 519 respectively.

Exemplary methods used by the SLP to locate the mobile may include but are not limited to, TDOA, TOA, RTD, AOA, RSSI, Advanced forward link trilateration ("A-FLT"), Enhanced observed time difference ("EOTD"), Observed time difference of arrival ("OTDOA"), time of arrival ("TOA"), uplink-TOA and uplink-TDOA, Enhanced cell/sector and cell-ID, etc., and hybrid combinations thereof.

The OMA SUPL location architecture is based on the premise that a device 410 has a home network, and all requests for location go through the SUPL server in the home network, i.e., H-SLP. That is, communication using SUPL goes between the H-SLP and the device. The H-SLP, however, may not be able to provide location information about a device 410 at a remote location (e.g. another continent, etc.)

If the device is in a visited network, then the authentication in the home network will have information about the visited network and using the information the identity of the location server in the visited network, the V-LS 436.

It is therefore an aspect of embodiments of the present subject matter to implement SUPL roaming in an exemplary network. One aspect of the present subject matter allows an H-SLP to obtain the identity and information for a V-SLP from the mobile.

The H-SLP may select a V-SLP from the identity information received from the LIS. The H-SLP may maintain a record of LIS and associated SLP in a database or look up table, such that the identification of the LIS provides potential SLP from which to select. The database may also have other associations related to the access network, LIS or SLP by which the selection of a V-SLP may be made. For example the database may include a course location estimate associated with the LIS or access network, or may include the QoS associated with the access network, or may contain other entities associated with the access network or LIS. Upon selection of a V-SLP, the H-SLP may proxy location requests to the V-SLP for assistance in the location determination process using OMA RLP or MLP.

Figure 6:
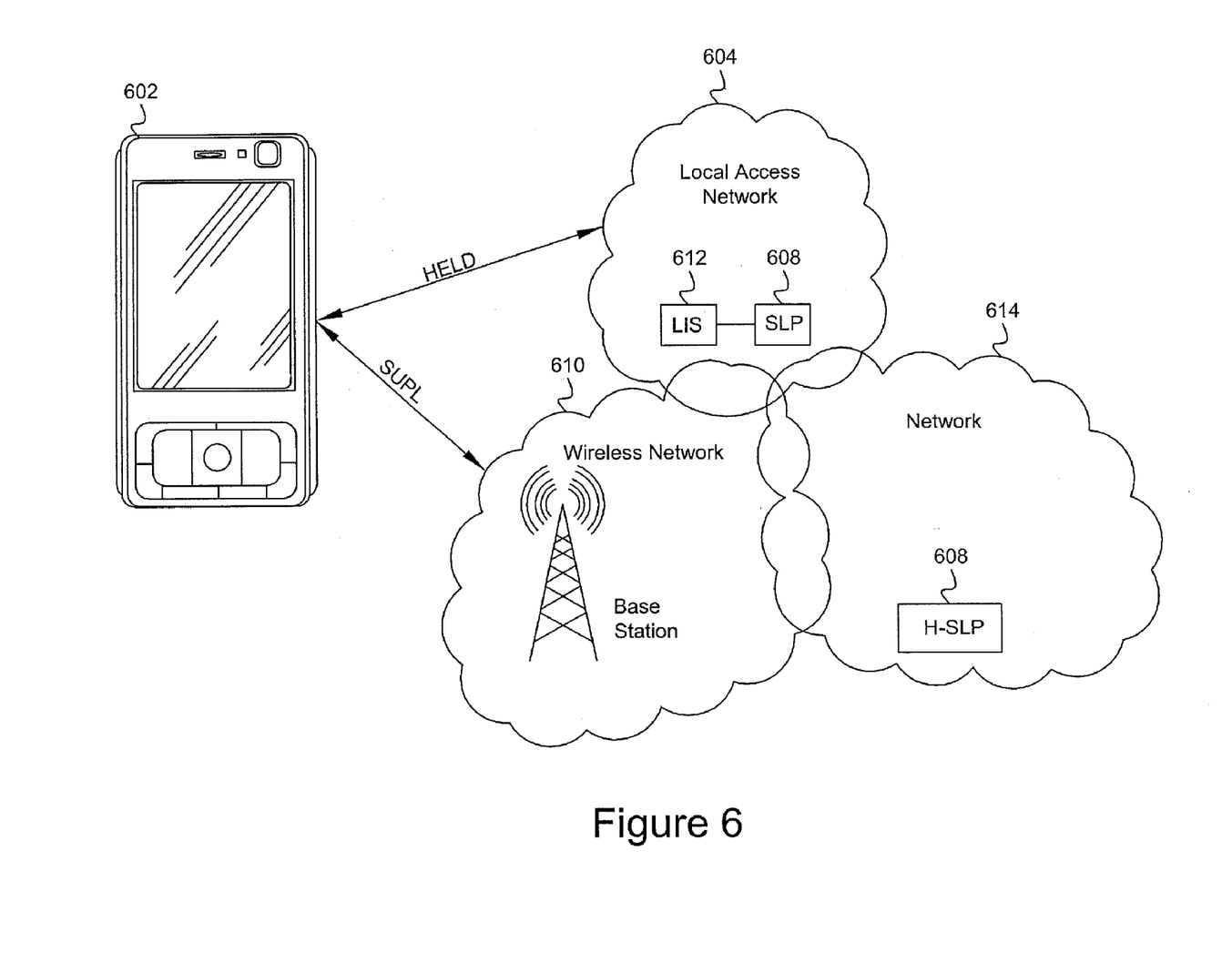
FIG. 6 is a schematic illustration of a system according to an embodiment of the present subject matter.

FIG. 6 is a representation of the interaction of the SET with a network according to an embodiment of the disclosed subject matter. An integrated SUPL SET and HELD client 602, a SUPL SLP 608 which acts as the H-SLP for the SET, a plurality of LISs 612 associated with the SET's access network, and one or more SLPs 608 associated with the access network, which may or may not be integrated with the LIS 612, and a access network 604 are shown.

In FIG. 6 the SET 602 communicates with respect to location with the local access network 604 using its HELD client. The local access network 604 maintains a LIS 612 that in this example is associated with a SLP 608. The local Access Network provides connection with network 614 or generally the Internet. The H-SLP 608 may be accessed through the network 614. The SET communicates over the Wireless Network 610 with respect to location according to SUPL. Once the LIS 612 or SLP 608 is identified or selected, the H-SLP 608 may establish the V-SLP over the network 614. The networks 604, 610 and 614 are generally interconnected at least via network 614. The local access network 604 and the wireless network need not be separate networks as shown and may be the same. As discussed previously the networks may be any of WiFi, WiMax, Bluetooth, 802.11, TDMA, CDMA, AMPS, GPRS, UMTS, LTE. WiFi, WiMax, Bluetooth, or 802.11, the access network may also be wired.

An exemplary mobile device or SET may be but is not limited to a cellular device, text messaging device, computer, portable computer, vehicle locating device, vehicle security device, communication device, and wireless transceiver.

While preferred embodiments of the present subject matter have been described, it is to be understood that the embodiments described are illustrative only and that the scope of the disclosed subject matter is to be defined solely by the appended claims when accorded a full range of equivalence, many variations and modifications naturally occurring to those of skill in the art from a perusal hereof.

What is claimed is:

1. A method of assisting in the selection of a visiting secure user plane location platform (V-SLP) for a mobile device, wherein the mobile device is tasked to gather characteristics of a wireless communications network and report the characteristics to a home secure user plane location platform (H-SLP) of which the mobile device is associated, comprising:
   accessing a network having an associated plurality of location information servers (LIS) and at least one associated secure user phone location platform (SLP);
   searching for at least one of the plurality of location information servers;
   receiving identifying information of at least one of the plurality of location information servers; and,
   transmitting the identifying information and the characteristics of the wireless communications network to the H-SLP to thereby assist the H-SLP in the selection of a V-SLP,
   wherein the identifying information comprises the uniform resource identifier (URI) of at least one of the plurality of location information servers.

2. The method of claim 1, wherein the identifying information comprises the URI of a SLP associated with the at least one of the plurality of location information servers.

3. The method of claim 1 wherein the step of assessing and searching comprises requesting access and requesting LIS information, respectively over the network.

4. The method of claim 1, wherein the network is one of the group consisting of WiFi, WiMax, Bluetooth, 802.11, TDMA, CDMA, AMPS, GPRS, UMTS, LTE.

5. The method of claim 1, further comprising receiving a SUPL start message from the H-SLP.

6. The method of claim 1, further comprising receiving the identity of the V-SLP from the H-SLP.

7. The method of claim 1, wherein said identity information is location information provided by the LIS.

8. The method of claim 7, wherein the location information is a location URI.

9. A method of selecting a second secure user plane location platform (SLP) for a mobile device, wherein the mobile device is an integrated secure user plane location (SUPL) and hypertext transfer protocol (HTTP) enabled location delivery (HELD) device comprising:
   initiating a SUPL session;
   accessing a network having an associated plurality of location information systems (LIS) and at least one associated SLP;
   requesting identity infoimation for at least one of the plurality of LIS;
   receiving the identity information at the mobile device;
   transmitting the identity information and network measurements from the mobile device to a first secure user plan location platform; and,
   receiving the identity information at the first SLP and selecting the second SLP based on the identity information,
   wherein the identity information comprises at least a uniform resource identifier (URI).

10. The method of claim 9, further comprising initiating roaming procedures with the second SLP.

11. The method of claim 10, wherein the step of initiating roaming procedures with the second SLP comprises identifying the mobile device to the second SLP.

12. The method of claim 9, wherein the identity infoimation includes the identity of the at least one associated SLP.

13. The method of claim 9, wherein the first SLP is a home SLP.

14. The method of claim 9, wherein the first SLP is an emergency SLP.

15. The method of claim 9, wherein the step of selecting the second SLP further comprises determining if the at least one of the plurality of LIS is a SLP based on the identity information.

16. The method of claim 9, wherein the first SLP determines if the selected second SLP is trustworthy based on the Quality of Service (QoS), URI and trustworthiness of the access network.

17. The method of claim 9, wherein the network accessed by the mobile device is selected from the group consisting of: WiFi, WiMax, Bluetooth, 802.11, TDMA, CDMA, AMPS, GPRS, UMTS, LTE.

18. The method of claim 9, wherein said identity information is location information provided by the LIS.

19. The method of claim 18, wherein the location information is a location URI.

20. A method of locating a SUPL enabled terminal (SET) mobile device having a hypertext transfer protocol (HTTP) enable Location delivery (HELD) client, comprising:

initiating a location session;

requesting network measurements of a wireless communications network from the mobile device;

receiving at a home secure user plane location platform (H-SLP) location information regarding location information servers (LISs) associated with a network accessible by the mobile device as a HELD client along with the network measurements; and, selecting a SLP as a visiting secure user plane location platform (V-SLP) based on the location information; and, initiating a roaming protocol with the V-SLP, and locating the mobile device in the V-SLP, wherein the location information is a location uniform resource identifier (URI).

21. The method of claim 20 wherein the network accessible by the mobile device is selected from the group consisting of: WiFi, WiMax, Bluetooth, 802.11, TDMA, CDMA, AMPS, GPRS, UMTS, LTE.

22. The method of claim 20, wherein said information is location information provided by the LIS.

23. A system for selecting a visiting secure user plane location platform (V-SLP) for a roaming mobile device comprising:

a SUPL enable Terminal (SET) having an integral hypertext transfer protocol (HTTP) enabled location delivery (HELD) client;

a local Access network assessable by the HELD client of the SET;

one or more location information systems (LIS) associated with the local access network, wherein at least one of the LIS is a SLP wherein identity information regarding the LISs associated with the local access network is provided to the mobile device over the local access network;

a home secure user plane location platform (H-SLP) associated with the mobile device, wherein the identity information is transmitted from the mobile device to the H-SLP over a wireless communication network; and, the H-SLP determines a V-SLP from the at least one SLP based on the identity information, wherein said identity information is a location uniform resource identifier (URI).

24. The system of claim 23, wherein said identity information is an URI of the LIS.

25. The system of claim 23, wherein said identity information is an URI of the at least one SLP.

26. The system of claim 23, wherein said identity information is location information provided by the LIS.

27. The system of claim 26, wherein the location information is a location URI.

* * * * *